US006265987B1

(12) United States Patent
Wang et al.

(10) Patent No.: US 6,265,987 B1

(45) Date of Patent: Jul. 24, 2001

(54) REMOTE CONTROL DEVICE WITH LEARNING FUNCTION

(76) Inventors: Mao-Shen Wang, 9F, No. 80-2, Hsin-Po-I St.; Jui-Hung Hsu, No. 9, Lane 47, An-Hsiang Rd., both of Hsin-Tien City, Taipei Hsien (TW)

( * ) Notice: Subject to any disclaimer, the term of this patent is extended or adjusted under 35 U.S.C. 154(b) by 0 days.

(21) Appl. No.: 09/046,970

(22) Filed: Mar. 24, 1998

(30) Foreign Application Priority Data

Dec. 4, 1997 (TW) .............................................. 086220230

(51) Int. Cl.[7] ........................................................ H04Q 7/00

(52) U.S. Cl. ................................ 340/825.69; 340/825.22; 340/5.22; 455/151.2; 341/176

(58) Field of Search ......................... 340/825.69, 825.72, 340/825.22, 5.22, 525, 825.63, 5.23, 5.25; 455/151.2; 341/176

(56) References Cited

U.S. PATENT DOCUMENTS 5,227,780 * 7/1993 Tigwell ........................... 340/825.72
5,237,319 8/1993 Hidaka .
5,379,453 * 1/1995 Tigwell ............................. 455/151.2
5,475,366 * 12/1995 Van Lente et al. .................. 340/525
6,021,319 * 2/2000 Tigwell ............................. 455/151.2

FOREIGN PATENT DOCUMENTS

WO 94/02920 * 2/1994 (WO) ............................. 340/825.69

* cited by examiner

*Primary Examiner*—Edwin C. Holloway, III
(74) *Attorney, Agent, or Firm*—Dougherty & Troxell

(57) ABSTRACT

A learning-type remote control device is capable of detecting both carrier frequency and control code in a remote control signal that is transmitted by a target remote control device, and includes a variable-frequency oscillating unit for generating a carrier signal having a frequency which varies according to magnitude of a frequency control signal from a digital-to-analog converting unit, a mixing unit for generating a mixed signal by mixing the carrier signal and the remote control signal, a signal detecting unit for generating a detected frequency signal and a detected control signal from the mixed signal, and a processing unit operable in a learning mode to provide a varying frequency count input to the converting unit. The processing unit detects lower and upper sideband frequency counts based on when the detected frequency signal from the signal detecting unit reaches a preset threshold voltage to determine a frequency count that corresponds to the carrier frequency of the remote control signal. The processing unit further determines the control code in the remote control signal from the detected control signal of the signal detecting unit, and stores the frequency count and the control code determined thereby in a memory unit.

13 Claims, 3 Drawing Sheets

REMOTE CONTROL DEVICE WITH LEARNING FUNCTION

BACKGROUND OF THE INVENTION

1. Field of the Invention

The invention relates to a remote control device, more particularly to a learning-type remote control device which is capable of detecting both the carrier frequency and the control code in a remote control signal that is transmitted by another remote control device, and which is capable of generating remote control signals of different carrier frequencies.

2. Description of the Related Art

Remote control devices, such as those used in the control of garage doors and car alarms, have become an indispensable part of our daily lives. Therefore, there is always a need to make back-up remote control devices in order to avoid replacement of the entire remote control system in the event that a remote control device has been misplaced.

U.S. Pat. No. 5,237,319 discloses a remote control device having a learning function in which a remote control signal transmitted from another remote control device is received to perform learning and to transmit a new remote control signal on the basis of the learning. When making a copy of a target remote control device, the learning-type remote control device is capable of learning a control code that is present in a remote control signal from the target remote control device. Thus, the learning-type remote control device is more convenient to program than one having no learning function. However, the remote control signal of a remote control device further includes a carrier signal portion that is modulated by the control code. Presently, a separate instrument is needed to measure the carrier frequency of the target remote control device, and to set the conventional learning-type remote control device to the measured carrier frequency before a copy of the target remote control device can be made.

Measurement of the carrier frequency of the target remote control device, and setting of the conventional learning-type remote control device to the measured carrier frequency are time-consuming tasks that cannot be accomplished by the consumer without using a separate instrument. Moreover, the conventional learning-type remote control device can only generate remote control signals of the same carrier frequency, thereby limiting its utility.

SUMMARY OF THE INVENTION

Therefore, the main object of the present invention is to provide a learning-type remote control device which is capable of detecting both the carrier frequency and the control code in a remote control signal that is transmitted by another remote control device.

Another object of the present invention is to provide a learning-type remote control device that is capable of generating remote control signals of different carrier frequencies.

Accordingly, the learning-type remote control device of this invention is capable of detecting both carrier frequency and control code in a remote control signal that is transmitted by a target remote control device, and comprises a control key unit, a memory unit, a digital-to-analog converting unit, a variable frequency oscillating unit, a mixing unit, a signal detecting unit, and a processing unit.

The control key unit includes a plurality of control keys. The memory unit has a plurality of memory spaces for storing a plurality of frequency counts and a plurality of control codes that correspond respectively to the control keys. The digital-to-analog converting unit converts a frequency count input into a frequency control signal. The variable-frequency oscillating unit is connected to the digital-to-analog converting unit and is operable so as to generate a carrier signal having a frequency which varies according to magnitude of the frequency control signal. The variable-frequency oscillating unit is further operable so as to modulate the carrier signal according to a control signal that is provided thereto. The mixing unit is adapted to wirelessly receive the carrier signal from the variable-frequency oscillating unit and the remote control signal from the target remote control device, and to generate a mixed signal by mixing the carrier signal with the remote control signal. The signal detecting unit is connected to the mixing unit for generating a detected frequency signal and a detected control signal from the mixed signal. The detected frequency signal indicates when the frequency of the carrier signal from the variable-frequency oscillating unit approaches lower and upper sideband frequencies of the remote control signal from the target remote control device. The detected control signal contains the control code of the remote control signal from the target remote control device. The processing unit is connected to the control keys, the memory unit, the digital-to-analog converting unit, the variable-frequency oscillating unit and the signal detecting unit. The processing unit is operable selectively in a learning mode and a signal generating mode in response to user operation of the control key unit.

When operated in the learning mode, the processing unit provides the frequency count input to the digital-to-analog converting unit. The processing unit varies the frequency count input to the digital-to-analog converting unit, and detects a minimum value of the frequency count input during which the detected frequency signal from the signal detecting unit reaches a preset threshold voltage as a lower sideband frequency count, and a maximum value of the frequency count input during which the detected frequency signal from the signal detecting unit reaches the preset threshold voltage as an upper sideband frequency count. The processing unit determines a frequency count that corresponds to the carrier frequency of the remote control signal transmitted by the target remote control device from the lower and upper sideband frequency counts. The processing unit further determines the control code in the remote control signal transmitted by the target remote control device from the detected control signal of the signal detecting unit. The processing unit stores the frequency count and the control code determined thereby in one of the memory spaces of the memory unit corresponding to an operated one of the control keys.

When operated in the signal generating mode, the processing unit retrieves the frequency count and the control code of an operated one of the control keys from the corresponding one of the memory spaces in the memory unit. The frequency count retrieved by the processing unit is provided to the digital-to-analog converting unit as the frequency count input. The control code retrieved by the processing unit is converted thereby into the control signal that is provided to the variable-frequency oscillating unit.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
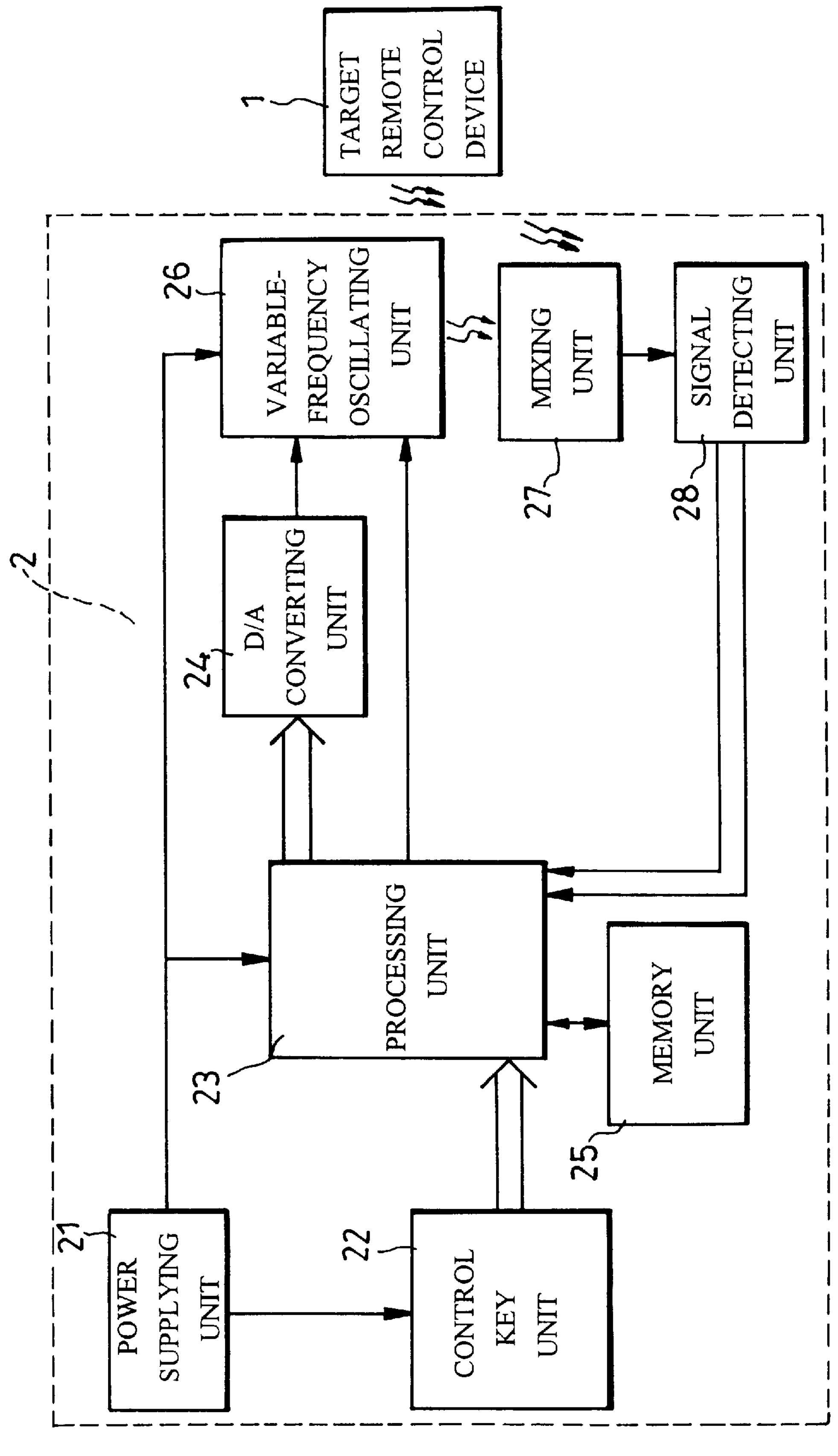
FIG. 1 is a schematic circuit block diagram of the preferred embodiment of a remote control device with a learning function according to the present invention.

Before the present invention is described in greater detail, it should be noted that like elements are denoted by the same reference numerals throughout the disclosure.

Figure 2:
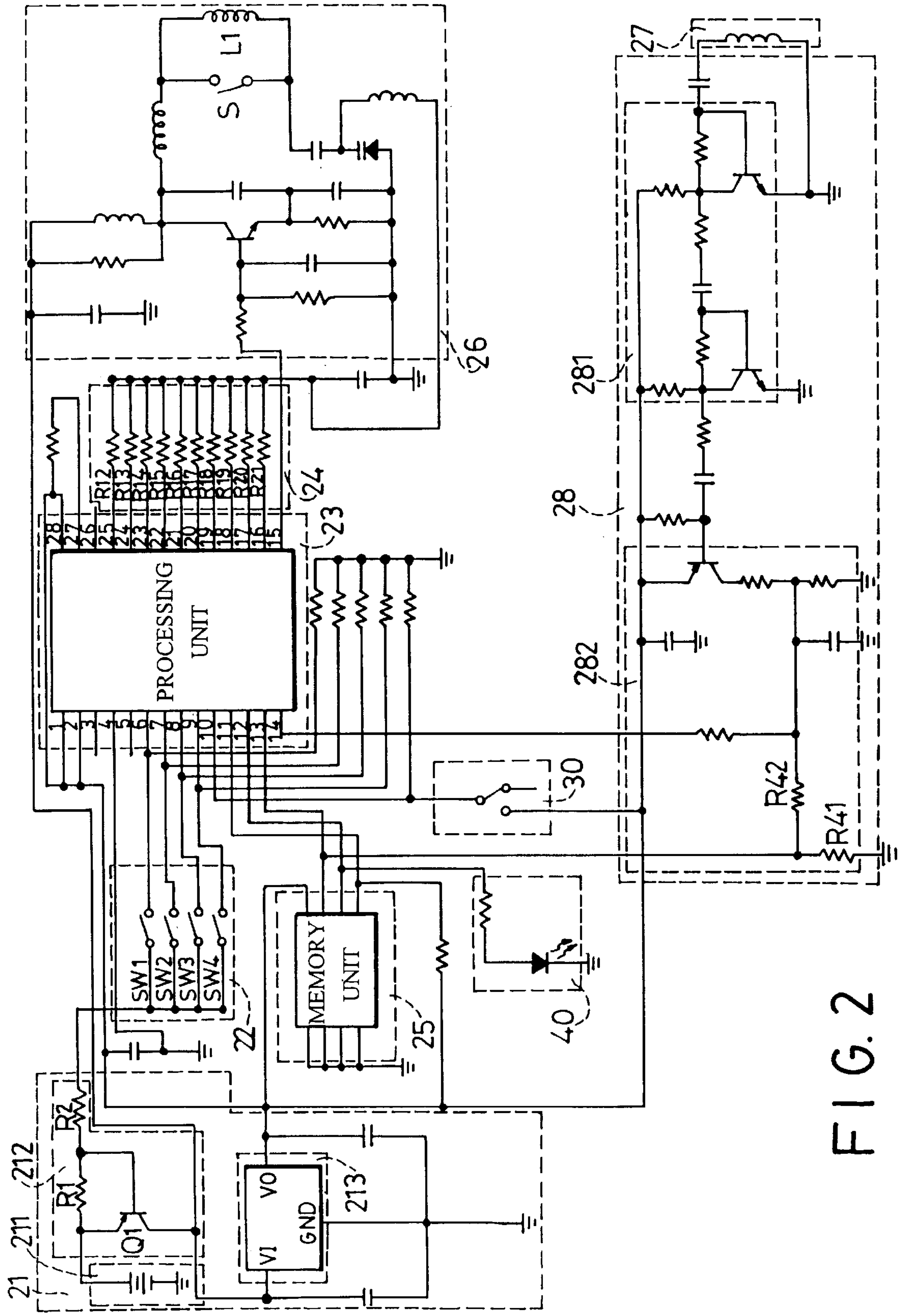
FIG. 2 is a schematic electrical circuit diagram of the preferred embodiment.

Referring to FIGS. 1 and 2, the preferred embodiment of a learning-type remote control device 2 according to the present invention is adapted to detect both the carrier frequency and the control code in a remote control signal that is transmitted by a target remote control device 1, and is shown to comprise a power supplying unit 21, a control key unit 22, a processing unit 23, a digital-to-analog (D/A) converting unit 24, a memory unit 25, a variable-frequency oscillating unit 26, a mixing unit 27, and a signal detecting unit 28.

The power supplying unit 21 includes a battery 211, a current limiter 212 and a voltage regulator 213. The current limiter 212 includes a transistor Q1 and first and second resistors R1, R2 that are connected in series. The transistor Q1 has an emitter connected to the positive terminal of the battery 211. The negative terminal of the battery 211 is grounded. The first resistor R1 is connected across the emitter and the base of the transistor Q1. The voltage regulator 213 has an input terminal connected to the collector of the transistor Q1.

The control key unit 22 includes a plurality of control keys. In this embodiment, the control key unit 22 includes four control keys SW1–SW4, each of which has a first switch contact connected to the second resistor R2 of the current limiter 212. When one of the control keys SW1–SW4 is operated, an electrical signal from the current limiter 212 is asserted at the second switch contact of the control key SW1–SW4. The control key unit 22 is used to control the operation of the remote control device 2 in the learning and signal generating modes. This will be described in greater detail in the succeeding paragraphs.

The processing unit 23, such as a microprocessor, receives an operating voltage from an output terminal of the voltage regulator 213. Pins 6 to 9 of the processing unit 23 are connected to the control keys SW1–SW4 of the control key unit 22, respectively. The processing unit 23 is operable in either the learning mode or the signal generating mode. Operation of the processing unit 23 in the learning mode is initiated when the control keys SW1–SW4 in a specified combination are operated simultaneously. In the learning mode, the processing unit 23 performs a frequency scanning operation to determine the carrier frequency of the target remote control device 1. Particularly, the processing unit 23 provides a varying binary frequency count input when operated in the learning mode. In this embodiment, the binary frequency count input is a 10-bit count input that ranges from 0000000000–1111111111 and that is provided at pins 16 to 25 of the processing unit 23. In the signal generating mode, the processing unit 23 provides a binary frequency count input at pins 16 to 25 thereof, and a control signal at pin 15 thereof.

The D/A converting unit 24 converts the binary frequency count input present at pins 16 to 25 of the processing unit 23 into a corresponding analog frequency control signal. In this embodiment, the D/A converting unit 24 is a conventional binary weighted resistor ladder and includes ten resistors R12–R21, each of which has an input side connected to a respective one of pins 16 to 25 of the processing unit 23, and an output side connected to the other resistors R12–R21. The frequency control signal is obtained at the output side of the resistors R12–R21.

The memory unit 25 is connected to pins 11 to 13 of the processing unit 23, and contains memory spaces for storing the frequency count and the control code corresponding to each of the control keys SW1–SW4. In the learning mode, the processing unit 23 stores a frequency count and a control code in the memory unit 25. In the signal generating mode, the processing unit 23 retrieves the frequency count and the control code from one of the memory spaces of the memory unit 25 corresponding to an operated one of the control keys SW1–SW4. The frequency count is then provided at pins 16 to 25 of the processing unit 23, while the control code is converted by the processing unit 23, such as by pulse-width modulation, to result in the control signal that is provided at pin 15 of the processing unit 23.

The variable-frequency oscillating unit 26 is a voltage-controlled oscillator that is connected to the D/A converting unit 24 such that the frequency of a carrier signal that is generated thereby varies according to the magnitude of the frequency control signal in a known manner. The oscillating unit 26 is further connected to pin 15 of the processing unit 23 so that the control signal from the processing unit 23 can modulate the carrier signal in a known manner during operation of the processing unit 23 in the signal generating mode.

In this embodiment, the oscillating unit 26 includes an inductor L1 that is connected across a manually operable switch S to permit operation of the oscillating unit 26 in two different frequency ranges. The inductor L1 and the switch S function as a manually switchable impedance branch. Particularly, when the switch S is closed to short-circuit the inductor L1, operation of the oscillating unit 26 is varied from a lower carrier signal frequency range to a higher carrier signal frequency range.

In the learning mode, the mixing unit 27 receives the carrier signal and the remote control signal that were transmitted wirelessly by the oscillating unit 26 and the target remote control device 1, respectively, and mixes the same, as is known in the art of wireless receivers.

The signal detecting unit 28 includes a low pass amplifier 281 and a control signal detector 282. The low pass amplifier 281 amplifies the mixed signal from the mixing unit 27, while the control signal detector 282 provides a detected frequency signal and a detected control signal obtained from the output of the low pass amplifier 281 to pins 13 and 14 of the processing unit 23, respectively.

In operation, when the frequency of the carrier signal from the oscillating unit 26 approaches the lower sideband or upper sideband frequencies of the remote control signal from the target remote control device 1, the detected frequency signal and the detected control signal reach preset threshold voltages of the processing unit 23. Under such a condition, operation of the processing unit 23 in the learning mode enables the latter to determine the carrier frequency of the target remote control device 1 from the lower sideband and upper sideband frequencies, and the control code in the remote control signal from the detected control signal of the control signal detector 282. The processing unit 23 then stores the frequency count and the control code determined thereby in the memory unit 25.

In this embodiment, the control signal detector 282 includes a pair of resistors R41, R42 which are arranged to form a voltage divider circuit that interconnects the control signal detector 282 to pins 13 and 14 of the processing unit 23, respectively. This permits the setting of a higher threshold voltage for the detected control signal as compared to that for the detected frequency signal in order to increase accuracy when the processing unit 23 determines the control code in the remote control signal transmitted by the target remote control device 1 from the detected control code of the control signal detector 282.

The operation of the preferred embodiment will now be described in greater detail with reference to FIGS. 1 and 2.

Initially, the control keys SW1–SW4 in a specified combination are operated simultaneously to operate the processing unit 23 in the learning mode. Thereafter, one of the control keys on the target remote control device 1 and a selected one of the control keys SW1–SW4 on the learning-type remote control device 2 are operated simultaneously. At this time, the processing unit 23 provides a minimum frequency count input, e.g. 0000000000, at pins 16 to 25 thereof. The D/A converting unit 24 converts the frequency count input into a corresponding frequency control signal that is received by the oscillating unit 26. The oscillating unit 26 then generates a carrier signal, the frequency of which varies according to the magnitude of the frequency control signal.

The mixing unit 27 receives the carrier signal and the remote control signal that were transmitted wirelessly by the oscillating unit 26 and the target remote control device 1, respectively, and the signal detecting unit 28 provides a detected frequency signal and a detected control signal to pins 13 and 14 of the processing unit 23, respectively. When the frequency of the carrier signal from the oscillating unit 26 is not within the range of the lower sideband frequencies of the remote control signal from the target remote control device 1, the detected frequency signal and the detected control signal do not reach the preset threshold voltages of the processing unit 23. The processing unit 23 then increments the frequency count input to 0000000001 to increase the frequency of the carrier signal from the oscillating unit 26.

The frequency count input from the processing unit 23 is continuously incremented until the detected frequency signal and the detected control signal reach the preset threshold voltages, indicating that the frequency of the carrier signal from the oscillating unit 26 approximates the lower sideband frequencies of the remote control signal from the target remote control device 1. The frequency count input from the processing unit 23 at this time is recorded as a lower sideband frequency count, and the processing unit 23 then provides a maximum frequency count input, e.g. 1111111111, at pins 16 to 25 thereof.

When the frequency of the carrier signal from the oscillating unit 26 is not within the range of the upper sideband frequencies of the remote control signal from the target remote control device 1, the detected frequency signal and the detected control signal from the signal detecting unit 28 do not reach the preset threshold voltages of the processing unit 23. The processing unit 23 decrements the frequency count input to 1111111110 to decrease the frequency of the carrier signal from the oscillating unit 26.

The frequency count of the processing unit 23 is continuously decremented until the detected frequency signal and the detected control signal reach the preset threshold voltages, indicating that the frequency of the carrier signal from the oscillating unit 26 approximates the upper sideband frequencies of the remote control signal from the target remote control device 1. The frequency count input from the processing unit 23 at this time is recorded as an upper sideband frequency count, and the processing unit 23 determines a carrier frequency count for the target remote control device 1 by averaging the lower sideband and upper sideband frequency counts. The detected frequency count is stored in one of the memory spaces of the memory unit 25 corresponding to the operated one of the control keys SW1–SW4. The above operation takes about 2 seconds to complete.

Upon determining the carrier frequency count for the target remote control device 1, the processing unit 23 demodulates the detected control signal from the control signal detector 282 to determine the control code in the remote control signal transmitted by the target remote control device 1. The detected control code is then stored in the memory space of the memory unit 25 corresponding to the operated one of the control keys SW1–SW4. This operation takes about 0.3 second to complete.

The learning procedure described beforehand is performed for all of the control keys SW1–SW4 of the learning-type remote control device 2.

In the signal generating mode, when one of the control keys SW1–SW4 is operated, the processing unit 23 retrieves the frequency count and the control code corresponding to the operated one of the control keys SW1–SW4 from the memory unit 25. The frequency count is received by the D/A converting unit 24 and is converted into a corresponding analog frequency control signal for controlling the oscillating unit 26 to generate a corresponding carrier signal. Moreover, the processing unit 23 provides the control code, in the form of a pulse-modulated control signal, to the oscillating unit 26 so as to modulate the carrier signal, thereby resulting in a remote control signal that can be used to control operation of an apparatus (not shown).

Preferably, the learning-type remote control device 2 further includes a select switch 30 that interconnects the output terminal of the voltage regulator 213 to pin 10 of the processing unit 23. When operated, the select switch 30 enables the processing unit 23 to associate a different setof the memory spaces of the memory unit 25 to the control keys SW1–SW4, thereby increasing the functions of the control keys SW1–SW4.

In the preferred embodiment, an indicator 40, such as a light emitting diode, is connected to the processing unit 23 and is activated by the latter to generate a blinking light output when the processing unit 23 accesses the memory unit 25, such as when storing or retrieving information from the memory unit 25.

Figure 3:
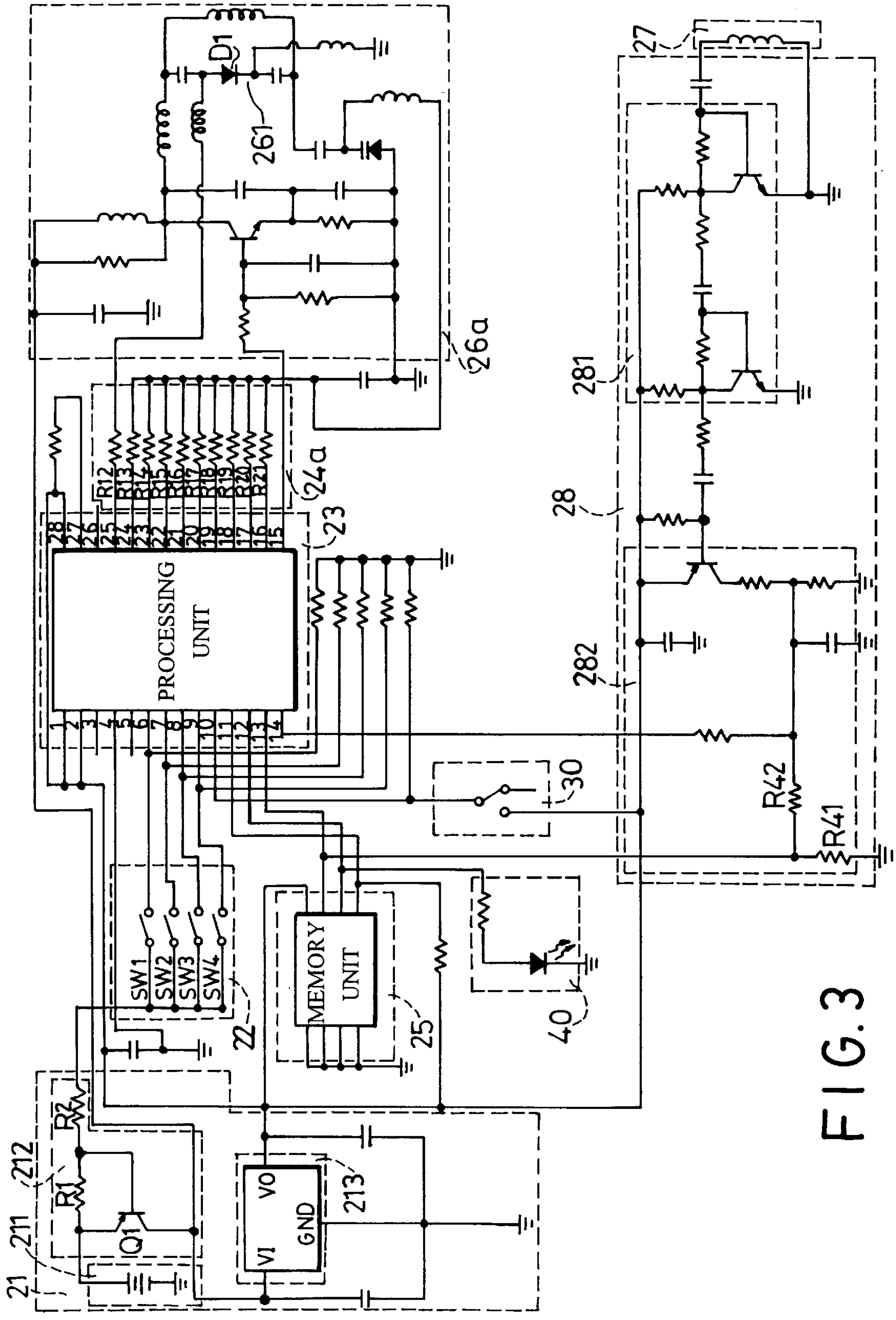
FIG. 3 is a schematic electrical circuit diagram of a modified embodiment of a remote control device with a learning function according to the present invention.

FIG. 3 is a schematic electrical circuit diagram of another preferred embodiment of a learning-type remote control device according to this invention. Unlike the embodiment of FIG. 2, the D/A converting unit 24*a* includes nine resistors R13–R21 connected respectively to pins 16 to 24 of the processing unit 23. The oscillating unit 26*a* includes an automatically switchable impedance branch 261 connected to pin 25 of the processing unit 23. In the learning mode, the processing unit 23 initially asserts a low logic signal at pin 25 thereof, thereby disconnecting the impedance branch 261 to operate the oscillating unit 26*a* in a lower carrier signal frequency range. Upon detecting that the carrier frequency of the target remote control device 1 is not within the lower carrier signal frequency range, the processing unit 23 asserts a high logic signal at pin 25 thereof, thereby biasing a diode D1 of the impedance branch 261 into conduction to operate the oscillating unit 26*a* in a higher carrier signal frequency range. The frequency scanning operation is then repeated to detect the carrier frequency of the target remote control device 1.

In the preferred embodiments, a signal amplifier, such as an operational amplifier circuit, can be employed to interconnect the D/A converting unit and the variable-frequency oscillating unit, thereby amplifying the analog frequency control signal from the D/A converting unit before supplying the same to the oscillating unit. This increases the bandwidth of the variable-frequency oscillating unit.

It has thus been shown that learning-type remote control device 2 of the present invention is capable of detecting both the carrier frequency and the control code in a remote control signal that is transmitted by another remote control device 1 without the need for using a separate instrument, thereby resulting in convenience when making a back-up remote control device. In addition, because it incorporates a controllable variable-frequency oscillating unit, the learning-type remote control device of this invention is capable of generating remote control signals of different carrier frequencies, thereby enhancing the utility of the remote control device. The objects of the present invention are thus met.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A learning-type remote control device capable of detecting both carrier frequency and control code in a remote control signal that is transmitted by a target remote control device, comprising:

a control key unit including a plurality of control keys;

a memory unit having a plurality of memory spaces for storing a plurality of frequency counts and a plurality of control codes that correspond respectively to said control keys;

a digital-to-analog converting unit for converting a frequency count input into a frequency control signal;

a variable-frequency oscillating unit connected to said digital-to-analog converting unit and operable so as to generate a carrier signal having a frequency which varies according to magnitude of the frequency control signal, said variable-frequency oscillating unit being further operable so as to modulate the carrier signal according to a control signal that is provided thereto;

a mixing unit adapted to wirelessly receive the carrier signal from said variable-frequency oscillating unit and the remote control signal from the target remote control device and to generate a mixed signal by mixing the carrier signal with the remote control signal;

a signal detecting unit connected to said mixing unit for generating a detected frequency signal and a detected control signal from the mixed signal, the detected frequency signal indicating when the frequency of the carrier signal from said variable-frequency oscillating unit approaches lower and upper sideband frequencies of the remote control signal from the target remote control device, the detected control signal containing the control code of the remote control signal from the target remote control device; and a processing unit connected to said control keys, said memory unit, said digital-to-analog converting unit, said variable-frequency oscillating unit and said signal detecting unit, said processing unit being operable selectively in a learning mode and a signal generating mode in response to user operation of said control key unit, operation of said processing unit in the learning mode enabling said processing unit to provide the frequency count input to said digital-to-analog converting unit, said processing unit varying the frequency count input to said digital-to-analog converting unit, and detecting a minimum value of the frequency count input during which the detected frequency signal from said signal detecting unit reaches a preset threshold voltage as a lower sideband frequency count, and a maximum value of the frequency count input during which the detected frequency signal from said signal detecting unit reaches the preset threshold voltage as an upper sideband frequency count, said processing unit determining a frequency count that corresponds to the carrier frequency of the remote control signal transmitted by the target remote control device from the lower and upper sideband frequency counts, said processing unit further determining the control code in the remote control signal transmitted by the target remote control device from the detected control signal of said signal detecting unit, said processing unit storing the frequency count and the control code determined thereby in one of said memory spaces of said memory unit corresponding to an operated one of said control keys, operation of said processing unit in the signal generating mode enabling said processing unit to retrieve the frequency count and the control code of an operated one of said control keys from the corresponding one of said memory spaces in said memory unit, the frequency count retrieved by said processing unit being provided to said digital-to-analog converting unit as the frequency count input, the control code retrieved by said processing unit being converted thereby into the control signal that is provided to said variable-frequency oscillating unit.

2. The learning-type remote control device as claimed in claim 1, wherein, in the learning mode, said processing unit varies the frequency count input to said digital-to-analog converting unit by incrementing a minimum frequency count until the minimum value of the frequency count input during which the detected frequency signal from said signal detecting unit reaches the preset threshold voltage is detected, and by decrementing a maximum frequency count until the maximum value of the frequency count input during which the detected frequency signal from said signal detecting unit reaches the preset threshold voltage is detected.

3. The learning-type remote control device as claimed in claim 1, wherein, in the signal generating mode, the control code retrieved by said processing unit from said memory unit is converted into the control signal by pulse modulation.

4. The learning-type remote control device as claimed in claim 3, wherein the pulse modulation is pulse-width modulation.

5. The learning-type remote control device as claimed in claim 1, wherein said digital-to-analog converting unit comprises a binary weighted resistor ladder.

6. The learning-type remote control device as claimed in claim 1, further comprising a voltage divider circuit which interconnects said signal detecting unit and said processing unit such that a higher threshold voltage can be set for the detected control signal as compared to that for the detected frequency signal in order to increase accuracy when said processing unit determines the control code in the remote control signal transmitted by the target remote control device from the detected control signal of said signal detecting unit.

7. The learning-type remote control device as claimed in claim 1, further comprising a select switch connected to said processing unit and operable so as to associate said control key unit with a selected one of two sets of said memory spaces in said memory unit.

8. The learning-type remote control device as claimed in claim 1, further comprising an indicator connected to and activated by said processing unit when said processing unit accesses said memory unit.

9. The learning-type remote control device as claimed in claim 1, wherein said variable-frequency oscillating unit includes a switchable impedance branch that is operable so as to vary operation of said variable-frequency oscillating unit from a lower carrier signal frequency range to a higher carrier signal frequency range.

10. The learning-type remote control device as claimed in claim 9, wherein said impedance branch is a manually switchable impedance branch.

11. The learning-type remote control device as claimed in claim 10, wherein said impedance branch includes an inductor, and a manually operable switch connected across said inductor and operable so as to short-circuit said inductor.

12. The learning-type remote control device as claimed in claim 9, wherein said impedance branch is an automatically switchable impedance branch.

13. The learning-type remote control device as claimed in claim 12, wherein said impedance branch is connected to said processing unit and includes a diode biased selectively into conduction by said processing unit so as to selectively connect and disconnect said impedance branch.

* * * * *